March 14, 1967     G. F. SMOOT ET AL     3,309,710

FLOOD HYDROGRAPH AND RAIN-GAGE RECORDER

Filed Oct. 1, 1965

INVENTORS
**GEORGE F. SMOOT
SAMUEL E. RICKLY
EDGAR G. BARRON**

BY

United States Patent Office 3,309,710
Patented Mar. 14, 1967

3,309,710
FLOOD HYDROGRAPH AND RAIN-GAGE RECORDER
George F. Smoot, Fairfax, Va., and Samuel E. Rickly, Grove City, and Edgar G. Barron, Columbus, Ohio, assignors to the United States of America as represented by the Secretary of the Interior
Filed Oct. 1, 1965, Ser. No. 492,343
1 Claim. (Cl. 346—49)

ABSTRACT OF THE DISCLOSURE

The recording instrument utilizes a horizontally disposed chart on the opposite parts of which dual writing elements are arranged to mark readings of water level corresponding to rain accumulation and flood stage. Each writing element is moved with a carriage riding on a helical screw. A precipitation collector is formed in the cover of the instrument such that its contents drains by gravity to a tube in a float operated measuring system. Level data is transmitted by a float position sensing wheel which is counterbalanced by a weight suspended from a drum mounted on an end of the helical screw positioning one of the writing elements. A similar float mechanism operating in a standpipe facilitates stage recordings by the other writing element.

The invention herein described and claimed may be manufactured and used by or for the Government of the United States of America for governmental purposes without the payment of royalties thereon or therefor.

This invention relates to instruments for recording two variable conditions on the same record sheet. The invention is of particular utility in hydrographic surveys and comprises means to create a permanent record of variable factors of water level, such as stage recording for flood hydrographs, and precipitation, including rain or snow, on a single record sheet for easy correlation of data.

Many areas of the United States are under investigation to determine the frequency, magnitude, volume and shape of hydrographs of floods from relatively small drainage areas. Also being studied are the intensity and duration of rainfall and other precipitation, such as snow. There is a developing need for detailed information on drainage areas as small as 10 square miles or less. Data on rainfall and water stage would be extremely valuable; however, existing instruments are prohibitively expensive, and fewer recordings can be made than with the instrument of this invention.

The demand for a simple, compact instrument for measuring and recording precipitation and stage has resulted in the invention of the present instrument. It incorporates as its principal features a circular chart drive, two float-operated stylus marking carriages with their associated supports and unique material supply and movements, a unitary base for the above apparatus including a hinged instrument cover with an integrally-mounted precipitation collector and drain tube, and a self-emptying rain-collecting pipe-well disposed below the instrument recording means.

Accordingly, it is an object of the present invention to disclose a unique instrument for measuring and recording water levels representing precipitation and flood stage. It is a further object of the invention to provide for dual, integrally-mounted recorders with their associated liquid level sensors, and to provide an integrally-mounted housing and rain collector. These and other objects and features of the present invention may be more readily ascertained by inspection of the accompanying drawing in which.

Figures 1, 2:
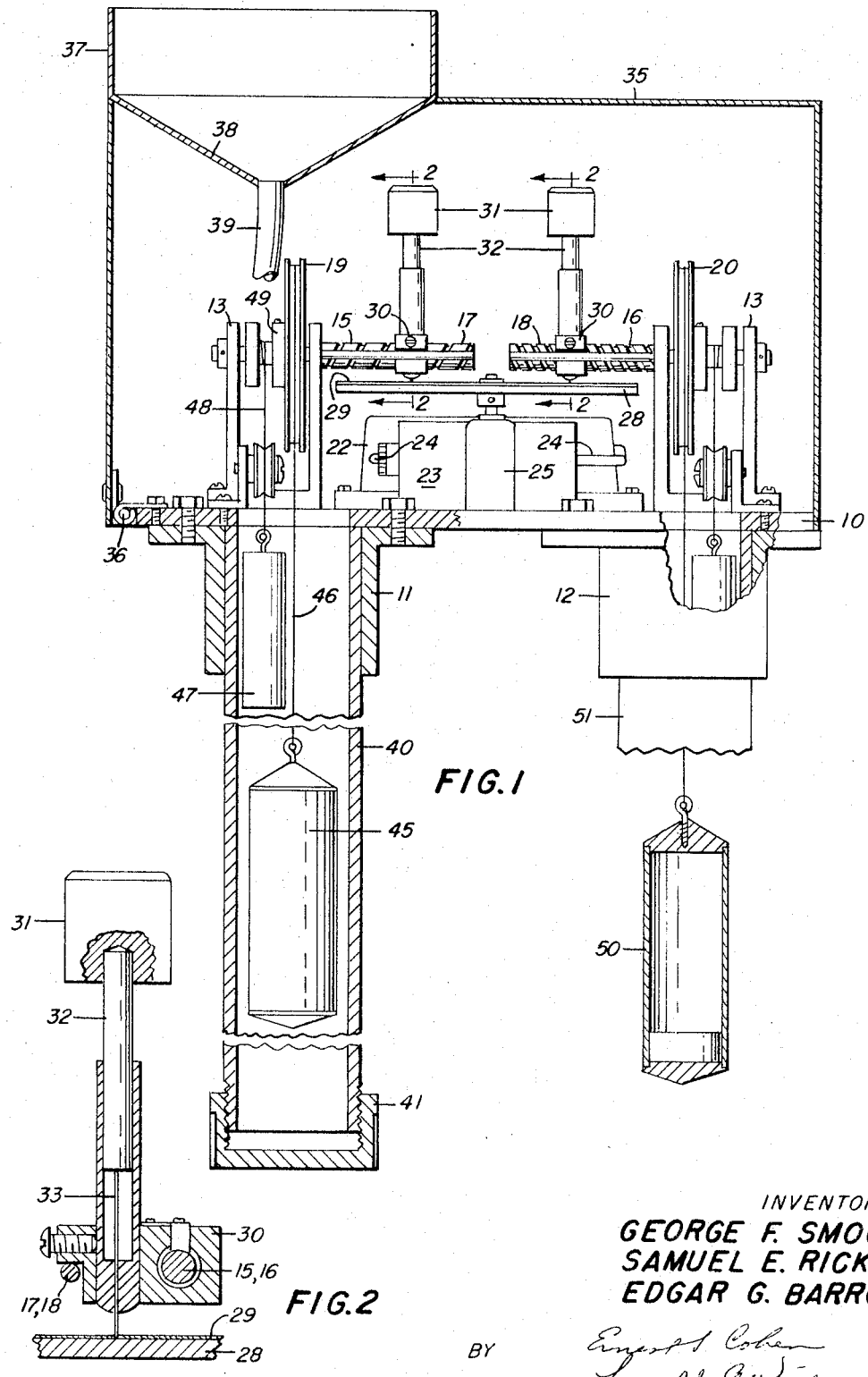
FIGURE 1 is a vertical view of the instrument, partially cut away.
FIGURE 2 is a vertical sectional view of the stylus marker taken along line 2—2 of FIGURE 1.

Referring to the drawing, the instrument comprises a base number 10, onto which are attached by screws, welding, or other suitable means, two pipe flanges 11 and 12. A support casting 13 for each of the recorder units is provided on the base 10, and attached to the support 13 are counter-weight drums 14, helical thrust means, such as screws 15 and 16, stylus guides such as bars 17 and 18, and float wheels 19 and 20. The chart drive means comprises a solenoid-wound power unit 22, which may turn at a rate of one revolution per day, per 7 days, or per half-day. Electric power is supplied by a 1½ volt "D" cell enclosed in battery case 23, which is connected to the power unit 22 by a cable 24, and mounted on the base 10 by a clip device 25. The chart drive means rotates a chart table 28, on which a circular chart 29 is placed.

Dual recording of hydrographic variables is obtained on the same circular chart by disposing the writing elements on opposite parts of the chart. By suitable time markings on the chart itself, the readings of water level corresponding to rain accumulation and stage may be correlated. The stylus marking means for each variable includes a base portion or carriage block 30, stylus weight 31, a plunger or stylus weight shaft 32, and a suitable stylus or solid marking material, such as pencil lead 33. The stylus pressure is maintained constant by the stylus weight 31 to obtain an even mark on the chart surface, and to advance the marking material as it is consumed during recording. As can be seen more clearly in FIG. 2, the carriage block 30 rides on a guide bar 17 and is advanced and retracted by the rotation of helical screws 15 and 16. In the present design the two stylus marking means are located 180° apart on the chart 29.

A uniform feature of the instrument is the design of the precipitation collecting means. An instrument cover 35 is movable attached to the base member 10 by a hinge element 36, which permits the easy removal of the cover 35 for inspection of the instrument, changing charts, maintenance, etc. The cover 35 has a rectangular precipitation collector 37 for catching rain and snow. The collector 37 is disposed above the rain-recording portions of the instrument, and precipitation is transported by gravity along a funnel 38, to which is soldered a drain tube 39. In order to by-pass the rain recording mechanism, drain tube 39 is bent forward to go around support 13, and its associated parts. Although not shown in the drawing, the drain tube 39 extends to the basic member 10, where the collected precipitation is discharged through a hole in the base 10, into a measuring system.

The amount of precipitation is determined by a float-operated measuring and recording system. A pipe well 40 is attached to flange 11 on the base member 10. The pipe may be of any suitable size for recording a given amount of precipitation. A 2" pipe was used in the preferred embodiment of the invention, and the ratio of the pipe cross-sectional area to that of the collecting area of the integrally-mounted precipitation collector 37 is such that 5 inches of precipitation results in a five foot rise in the level of water in the pipe well 40. The bottom of the pipe is sealed by any suitable means such as cap 41, and its length may be varied considerably without departing from the inventive concept. In the particular arrangement or parts used, sufficient length of pipe must be provided for travel of the float mechanism below a siphon hole, five feet for the changes in water level, and about one foot minimum for counterweight movement and for clearances, giving a total of six feet. The pipe well may be drained at a predetermined level, such as five feet of collected rain, by a syphon tube device, such as that shown in U.S. Patent 2,735,298 to Dispenza. In the preferred embodiment a syphon tube (not shown) is soldered at a tap hole near the bottom of the pipe well 40 and extended upwardly for about five feet, where it is bent carefully and returned to a point about 6 inches below the syphon tube tap hole. The tubing is 5/16" in diameter, such as copper refrigeration tubing, and affords a rapid emptying of the device at the end of a cycle of 5 inches of precipitation. This arrangement provides a drawing time of about 2 minutes. A small amount of oil may be added to the pipe well 40 to prevent evaporation of collected water.

The level of water in the pipe well 40 is transmitted to the instrument by a mechanism comprising plastic float 45 having a stainless steel cable 46, which is 9-pound test, hard-braid casting line having a diameter of about 0.015". The cable 46 is attached to the float wheel 19 on the rain recorder, which it rotates in proportion to float position. Counter-balance means for operating the float is provided by attaching a counterweight 47 by a similar cable or nylon line 48 to a counterweight drum 49 mounted on helical thrust screw 15. The diameter ratio of float wheel 19 to drum 49 is such that a large movement of the float 45 is necessary to deflect the counterweight a small amount, thus providing a reduced travel, which permits the use of small diameter pipe 40, since the float and counterweight do not pass one another.

A similar float mechanism is provided for the stage recording portions of the instrument, and the level of a stream or body of water is transmitted to the instrument by float 50 operating in a standpipe.

The ranges of stage recording may vary considerably. Three ranges of 5, 10, and 20 feet have been used with the instrument shown in the drawing. The translation of linear float motion to rotational motion and back to a linear stylus trace may be altered by changing the pitch of the screws on thrust means 16. The usable width of a typical 5-inch circular chart is two inches, and a chart readability of 0.01 inch gives an accurate record of stage level.

The stylus leads used as consumable solid marking material should be black leads, 1⅜" x .036", similar to "Fineline" leads. Hardness may vary from H to 4H. It has not been considered necessary to sharpen the leads, since such point would soon wear off on the chart use. The charts used are preferably Mylar charts with a waterproof matte finish, which may be wiped clean and reused.

While only one embodiment of the invention has been shown and described, it is to be expressly understood that the invention is not limited thereto, but that it may be embodied in various forms by those skilled in the art, without departing from the scope of the invention. Reference will be had to the appended claim for a definition of the limits of the invention.

What is claimed is:

A hydrographic instrument comprising integrally-mounted precipitation recording means and water stage recording means;

each of said recording means having a float mechanism for sensing liquid level, and cable means for transmitting motion to a base-mounted support for angular translation of motion;

helical thrust means for translating angular motion to horizontal linear motion proportional to float position;

chart drive means for rotating a circular chart in a horizontal plane at a uniform speed;

dual stylus marking means each having a guide bar and operated by the helical thrust means connected to each of the precipitation float and water range float, said stylus marking means being located about 180° apart on the chart, said stylus marking means having a weight-actuated device for supplying solid marking material to the chart surface;

syphon means for draining a precipitation-collecting pipe well at a predetermined level corresponding to a given quantity of precipitation;

counter-balance means for operating the cable means, having a reduced travel over corresponding floats; and a hinged instrument cover having integrally-mounted thereon a precipitation-collecting means having a drain tube leading to the precipitation-collecting pipe well.

No references cited.

RICHARD B. WILKINSON, *Primary Examiner.*

M. LORCH, *Assistant Examiner.*